United States Patent
Cadra et al.

(10) Patent No.: US 10,759,921 B2
(45) Date of Patent: Sep. 1, 2020

(54) METHOD FOR PRODUCING AN AQUEOUS FOAM

(71) Applicant: COMMISSARIAT A L'ENERGIE ATOMIQUE ET AUX ENERGIES ALTERNATIVES, Paris (FR)

(72) Inventors: Stephane Cadra, Saint Avertin (FR); Jean-Felix Salas, Montbazon (FR); Alexia Balland-Longeau, Tours (FR); Francois Garonne, Saint Pierre des Corps (FR); Sylvain Faure, Venasque (FR); Bruno Imbert, Grenoble (FR)

(73) Assignee: COMMISSARIAT A'LENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 515 days.

(21) Appl. No.: 15/525,718

(22) PCT Filed: Nov. 17, 2015

(86) PCT No.: PCT/EP2015/076851
§ 371 (c)(1),
(2) Date: May 10, 2017

(87) PCT Pub. No.: WO2016/079136
PCT Pub. Date: May 26, 2016

(65) Prior Publication Data
US 2018/0355139 A1 Dec. 13, 2018

(30) Foreign Application Priority Data
Nov. 18, 2014 (FR) ..................... 14 61155

(51) Int. Cl.
| | | |
|---|---|---|
| C08J 9/30 | (2006.01) | |
| A62D 3/38 | (2007.01) | |
| C06B 21/00 | (2006.01) | |
| C08J 9/00 | (2006.01) | |
| A62D 3/33 | (2007.01) | |
| B01J 20/24 | (2006.01) | |
| B01J 20/28 | (2006.01) | |
| G21F 9/00 | (2006.01) | |
| A62D 101/06 | (2007.01) | |

(52) U.S. Cl.
CPC ............ *C08J 9/30* (2013.01); *A62D 3/33* (2013.01); *A62D 3/38* (2013.01); *B01J 20/24* (2013.01); *B01J 20/28047* (2013.01); *C06B 21/0091* (2013.01); *C08J 9/0061* (2013.01); *G21F 9/00* (2013.01); *A62D 2101/06* (2013.01); *C08J 2305/00* (2013.01); *C08J 2305/08* (2013.01); *C08J 2305/12* (2013.01); *C08J 2425/08* (2013.01)

(58) Field of Classification Search
CPC ..... C08J 9/30; A62D 3/33; B01J 20/24; B01J 20/28047; G21F 9/00
USPC ................................................. 588/1
See application file for complete search history.

(56) References Cited

U.S. PATENT DOCUMENTS

| | | | |
|---|---|---|---|
| 3,801,015 A * | 4/1974 | Hayes | A47L 11/34 239/175 |
| 5,360,828 A | 11/1994 | Morrison | |
| 5,382,285 A | 1/1995 | Morrison | |
| 5,851,461 A | 12/1998 | Bakis et al. | |
| 2011/0071334 A1 | 3/2011 | Goffinet | |
| 2015/0110560 A1 | 4/2015 | Faure et al. | |

FOREIGN PATENT DOCUMENTS

WO   2009153495 A2   12/2009

OTHER PUBLICATIONS

Unpublished U.S. Appl. No. 15/328,684, filed Jan. 24, 2017.

* cited by examiner

*Primary Examiner* — Edward M Johnson
(74) *Attorney, Agent, or Firm* — Pearne & Gordon LLP

(57) ABSTRACT

A method for producing an aqueous foam comprising (a) preparing a solution comprising at least one surfactant and at least one protic polar solvent, (b) bringing the solution into contact with a pressurised gas to obtain a two-phase mixture, and (c) injecting the two-phase mixture to obtain the aqueous foam after expansion or dispersion of the gas. The solution further comprises at least one gelling compound chosen from a non-nitrogenous polysaccharide and gelatin. An aqueous foam obtained by such method and uses of the same, in particular in the fields of decontamination, the purification of effluents, or the defusing or containment of explosive devices or suspected explosive devices.

16 Claims, 1 Drawing Sheet

METHOD FOR PRODUCING AN AQUEOUS FOAM

CROSS-REFERENCE TO RELATED APPLICATIONS

This application is a U.S. national phase under the provisions of 35 U.S.C. § 371 of International Patent Application No. PCT/EP15/76851 filed Nov. 17, 2015, which in turn claims priority of French Patent Application No. 1461155 filed Nov. 18, 2014. The disclosures of such international patent application and French priority patent application are hereby incorporated herein by reference in their respective entireties, for all purposes.

TECHNICAL FIELD

The present invention relates to a method for producing a stable aqueous foam further having self-supporting properties as well as, optionally, improved complexing or sequestering properties.

The invention also relates to an aqueous foam obtained, or likely to be obtained, by this production method.

The invention further relates to the use of such an aqueous foam, in particular in the field of decontamination, in the field of effluent treatment or even in the field of containment or defusing of explosive devices or devices suspected of being explosive.

STATE OF PRIOR ART

A foam is a two-phase medium consisting of a solid or liquid material, closely blended with gas. In this case, this is respectively called a solid foam or a liquid foam.

Within the scope of the present invention, a liquid foam, also called an "aqueous foam" will be considered, the latter terms being that which will be used in the following of the present description.

An aqueous foam can be obtained by the dispersion of a gas in a solution, this dispersion can in particular be obtained by injecting bubbles of this gas into said solution or by expanding this gas in said solution. In the latter case, the expansion of the gas will cause the bubbles of said gas to appear and generate an expansion of the liquid phase consisting of the solution.

An aqueous foam thus has an alveolar structure formed by gas bubbles trapped in solution cells. These liquid cells, the diameter of which is in the order of one millimetre, are comprised by solution films which join together in Plateau edges connected by nodes.

An aqueous foam is most often described by its expansion ratio, noted ER, which corresponds to the ratio of the volume occupied by the aqueous foam once it is formed to the volume of the injected solution for producing said aqueous foam:

$$ER = \frac{V_{aqueous\ foam}}{V_{solution}}$$

However, after it is formed, the alveolar structure of the aqueous foam evolves under the effect of the three following main mechanisms:

drainage: under the effect of gravity, the liquid phase flows to the bottom along the array of solution films which join the Plateau edges. A dry foam at the top and a moist foam at the bottom is obtained;

coalescence of bubbles: the drainage causes thinning of the films of the aqueous foam. From some thickness, the film is no longer able to resist to disturbances and is broken, causing the coalescence of the gas bubbles; and maturing: in accordance with Laplace Law, the pressure inside small bubbles is higher than that of inside larger bubbles. This phenomenon speeds up coalescence of bubbles, the smallest one emptying in greater ones, causing a gradual increase in the bubble size.

The stability of the aqueous foam is its ability to preserve its alveolar structure over time.

The evolution of this alveolar structure, which thus enables the stability of the aqueous foam to be assessed, can be followed by the sedimentation velocity of this aqueous foam, and be in particular measured by the collapse of this aqueous foam after depositing in a given container, such as a graduated cylinder as will be seen in the examples hereinafter.

It is already known to improve the stability of an aqueous foam by adding, to the solution, a surfactant which adsorbs at the gas/liquid interfaces.

If some aqueous foams thus have a stability over a period ranging from a few minutes to several months, however they do not have necessarily a second so-called self-support property.

The self-support property, or self-supporting property, is defined as being the ability of the aqueous foam to preserve its shape after depositing an aggregate of this aqueous foam onto a surface in the absence of any support, for example of the tent or cylinder type. This self-support property can also be defined as being the ability of an aqueous foam to reach significant heights, from a given area or a given volume.

The self-support of an aqueous foam can also be quantised by the maximum height, noted MH, that this aqueous foam can reach. This maximum height MH is dependent on three forces which act on the aggregate of the aqueous foam:

gravity which tends to flatten the aggregate of aqueous foam onto the surface on which the aggregate has been deposited, shear strength, which opposes to the movement of the bubbles. If the aqueous foam is regarded as a viscoelastic fluid, this is the conservative component of the elastic modulus, noted G, and viscosity, being the dissipative component of this elastic modulus G.

The purpose of the present invention is thus to provide a method for producing an aqueous foam which has, concomitantly, stability and self-support properties.

Another purpose of the invention is to provide a method for producing an aqueous foam which has, in addition to the stability and self-support properties, complexing properties, in particular complexing properties for metallic cations.

By complexing properties, also called "complexation properties" or "sequestering properties", it is intended the ability of the alveolar structure of the aqueous foam to retain species present in solution and, hence, to reduce the diffusion of such species in the drainage liquid phase. It is considered that an aqueous foam has complexing properties for a given species when the concentration of said species in the drainage liquid phase is lower than the concentration of the same species in the solution that enabled the aqueous foam to be formed. Such species can, in particular, be metallic cations.

DISCLOSURE OF THE INVENTION

The previously set out purposes, as well as others, will be achieved, firstly, by a method for producing an aqueous foam of the abovementioned type, that is a method which comprises the following steps of:
  (a) preparing a solution comprising at least one surfactant and at least one protic polar solvent,
  (b) contacting the solution prepared in step (a) with a pressurised gas, whereby a two-phase mixture is obtained, and
  (c) injecting the two-phase mixture obtained in step (b), whereby, after expansion or dispersion of the gas, the aqueous foam is obtained.

According to the invention, the solution further comprises, at least one gelling compound chosen from a non-nitrogenous polysaccharide and gelatine.

The implementation of at least one gelling compound chosen from a non-nitrogenous polysaccharide and gelatine, in mixture with the other compounds present in the solution from which the aqueous foam is produced—in particular, the surfactant(s) and the polar protic solvent(s)—enables the alveolar structure of the aqueous foam to be fixed, by gelling, after the same is formed. Its alveolar structure being gelled, the aqueous foam thus produced is not only stable, but is also self-supporting, in that it does not collapse under the effect of shear forces induced by gravity and the absence of a support.

As demonstrated hereinafter, in the examples, because of the gelled alveolar structure, the aqueous foam according to the invention is also characterised by complexing or sequestering properties.

Documents U.S. Pat. Nos. 5,360,828 and 5,382,285, respectively referenced [1] and [2] in the following of the present description, describe a method of forming a foam from a solution comprising a polysaccharide, such as a non-nitrogenous polysaccharide, and a protic polar solvent, such as water.

The production method described in documents [1] and [2] more precisely comprises the following successive steps of:
  (a) preparing the solution comprising a polysaccharide and a protic polar solvent,
  (b) forming a gel from this solution,
  (c) freezing the gel, and
  (d) freeze-drying this gel to form a foam.

At the end of the production method described in these documents [1] and [2], a solid foam is thus obtained, in opposition to the aqueous nature of the foam as obtained by the production method according to the invention. Yet, because of its solid alveolar structure, a solid foam does not have complexing properties, unlike the aqueous foam which is obtained by the production method according to the invention and which behaves as a viscoelastic liquid.

As previously indicated, the solution prepared in step (a) of the method according to the invention comprises at least one gelling compound chosen from a non-nitrogenous polysaccharide and gelatine, at least one surfactant and at least one protic polar solvent.

The gelling compound implemented within the scope of the present invention is more particularly a compound having the ability to gel, that is having the ability to form hydrogen bonds by lowering its temperature below a threshold temperature, called a "gelling temperature", after the aqueous foam is formed.

The solution prepared in step (a) can only comprise a single gelling compound, that is either a non-nitrogenous polysaccharide, or gelatine. But, this solution can also comprise a mixture of two, three, or more, gelling compounds, for example a mixture of a non-nitrogenous polysaccharide with gelatine or even a mixture of several non-nitrogenous polysaccharides, the latter mixture further possibly comprising gelatine.

A polysaccharide is a polymer consisting of several ores linked to each other by O-osidic bonds, hence its equivalent polyoside meaning.

The phrase "non-nitrogenous polysaccharide", used above and in the following of the present description, means that the polysaccharide comprises no nitrogen atom in its structure. Conversely, the phrase "nitrogenous polysaccharide" means that the polysaccharide comprises at least one nitrogen atom in its structure.

A non-nitrogenous polysaccharide having the ability to gel, by decreasing the operating temperature under the gelling temperature, is conventionally, a water-soluble natural polymer.

One advantage to implement one or more non-nitrogenous polysaccharides and/or gelatine lies in the fact that these compounds do not have toxicity for the operating staff and environment. Further, these polysaccharides and gelatine are chemically compatible with a significant number of surfactants. By chemical compatibility, it is intended that there is no particular reaction between these gelling compounds and the surfactants.

This non-nitrogenous polysaccharide can be chosen from a glucan, a galactan and an alginate, the alginate being a polysaccharide obtained from brown algae (lamina and fucus).

The non-nitrogenous polysaccharide is advantageously a glucan or a galactan.

When the non-nitrogenous polysaccharide is a glucan, it can in particular be chosen from starch, cellulose, dextrin and pectin.

When the non-nitrogenous polysaccharide is a galactan, it can in particular be chosen from agar-agar and the carrageenan.

In a preferential alternative, the non-nitrogenous polysaccharide is agar-agar.

The solution prepared during step (a) also comprises at least one protic polar solvent.

As explained above for the gelling compound(s), the solution can comprise only one protic polar solvent, but can also comprise a mixture of two, three, or more, protic polar solvents.

In the above and below, the phrase "protic polar solvent" is taken in its usual meaning, that is it designates a solvent which has a non-zero permanent dipolar moment and which has at least one hydrogen atom linked to a heteroatom, such that this solvent can exchange one or more protons with the compounds which are dissolved in this solvent.

The protic polar solvent can in particular be chosen from water and an alcohol.

Water can for example be demineralised water, distilled water or even deionised water.

Alcohol is advantageously a linear or branched alcohol, having the molecular formula $C_nH_{2n+2}O$, with $1 \leq n \leq 5$.

The solution prepared during step (a) also comprises at least one surfactant. As already set forth before, by adsorbing at the gas/liquid interfaces of the solution films forming the alveolar structure of the aqueous foam, the surfactant improves the stability of this aqueous foam.

As explained above for the gelling compound(s) and the protic polar solvent(s), the solution can comprise only one surfactant, but can also comprise a mixture of two, three, or more surfactants.

The surfactant can be chosen from an anionic surfactant, a cationic surfactant and a non-ionic surfactant.

In the case where the surfactant is an anionic surfactant, it can be chosen in particular from sodium salts, or even potassium salts, having a long carbon chain, sodium octylsulphate, sodium decylsulphate or sodium laurylethersulphate.

In the case where the surfactant is a cationic surfactant, it can be in particular chosen from long carbon chain ammonium salts, such as dodecyltrimethylammonium salt.

In the case where the surfactant is a non-ionic surfactant, it can be in particular polymeric and, in particular, polyvinylic alcohol (PVA).

Examples of surfactants likely to be implemented in the solution prepared during step (a) are in particular marketed by the Eau & Feu company under the reference DP-SF/2 or even by the Corda Uniser company under the reference Retofoam R2. As will be seen in the examples, reference DP-SF/2 encompasses a mixture of anionic surfactants with a non-ionic surfactant.

In a particularly advantageous alternative of the method according to the invention, the solution prepared in step (a) further comprises at least one nitrogenous polysaccharide and, optionally, at least one compound enabling said nitrogenous polysaccharide to be dissolved in the solution.

This nitrogenous polysaccharide can in particular be a chitosan.

In a preferential alternative, the nitrogenous polysaccharide is a chitosan.

A chitosan is a polysaccharide obtained by a chemical or enzymatic N-deacetylation of chitin, chitin being itself a natural nitrogenous polysaccharide produced from fungi or from shell of marine molluscs.

The chemical N-deacetylation of chitin consists in hydrolysing, in a basic medium, all or part of the —NH—COCH$_3$ amide functions present in the chitin structure into —NH$_2$ amine functions.

Chitosan is thus a polysaccharide formed by the random distribution of N-deacetylated units of D-glucosamine (comprising a function —NH$_2$) and of N-acetylated units of N-acetyl-D-glucosamine (comprising a function —NHCOCH$_3$).

The N-deacetylation degree (expressed as a percentage and noted DD) of the chitosan is defined by the number of N-deacetylated units (functions —NH$_2$) divided by the total number of N-deacetylated units and of N-acetylated units (functions —NH$_2$+functions —NHCOCH$_3$) in this polysaccharide.

The boundary between chitosan and chitin corresponds to an N-deacetylation degree DD of 50%. In other words, when DD 50, this is chitin, whereas when DD>50, this is chitosan.

For simplifying the terminology used in the present patent application, the term "chitosan" covers not only chitosan (with DD>50), but also chitin (with DD≤50).

Thus, the chitosan implemented within the scope of the present invention has the following structural formula (I):

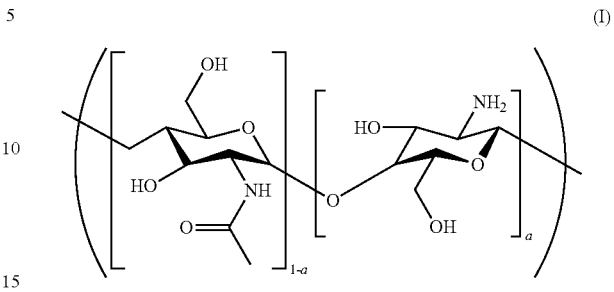

with α, which corresponds to the number of N-deacetylated units, such that 0≤α≤1.

In an advantageous alternative of the invention, chitosan has the above formula (I) wherein a is such that 0.5<α≤1.

In a preferential alternative of the invention, chitosan has the above formula (I) wherein a is such that 0.75≤α≤1.

When the nitrogenous polysaccharide(s) is (are) not suitably dissolved in the solution, which is generally the case when the pH of this solution has a value higher than or equal to 7, the solution further comprises at least one additional compound enabling the pH of the solution to be lowered to a value lower than 7.

Unexpectedly and surprisingly, it is observed that the production of an aqueous foam according to the method of the invention, from an acidic solution, enables a particularly stable aqueous foam to be obtained, unlike what is commonly accepted.

This additional compound enabling the nitrogenous polysaccharide(s) to be dissolved in the solution can be chosen from an inorganic acid, an organic acid and a mixture of two or more of these acids.

In the case where the additional compound is an inorganic acid, it can be in particular chosen from hydrochloric acid (HCl), hydrobromic acid (HBr), hydrofluoric acid (HF), sulphuric acid (H$_2$SO$_4$) and phosphoric acid (H$_3$PO$_4$).

In the case where the additional compound is an organic acid, it can in particular be chosen from a carboxylic acid having the molecular formula C$_m$H$_{2m+1}$COOH with 0≤m≤5 and a dicarboxylic acid having the molecular formula HOOC(CH$_2$)$_m$COOH with 0≤m≤5.

In an advantageous alternative, the organic acid can be acetic acid, of the formula CH$_3$COOH (m=2).

In an advantageous alternative of the invention, the solution prepared in step (a) comprises the following mass proportions, relative to the mass of the protic polar solvent(s):
from 1% to 20% of the gelling compound(s) and, optionally, of the nitrogenous polysaccharide(s),
from 5% to 25% of the surfactant(s), and
from 0% to 10% of the compound(s) enabling the nitrogenous polysaccharide to be dissolved in the solution.

After step (a) of preparing the solution comprising at least one surfactant, at least one protic polar solvent, at least one gelling compound chosen from a non-nitrogenous polysaccharide and gelatine and, possibly, at least one nitrogenous polysaccharide and, optionally, at least one compound enabling the nitrogenous polysaccharide(s) to be dissolved in said solution, step (b) of the production method according to the invention is carried out, which consists in contacting the solution thus prepared in step (a) with a pressurised gas, also called carrier gas, whereby a two-phase mixture is obtained.

This contacting of the solution with this pressurised gas, or carrier gas, enables the solution to be mixed, by bubbling, with said gas and the corresponding two-phase mixture to be obtained. This contacting of the gas with the solution is typically performed in a mixer device enabling the liquid phase formed by the solution to be homogenised with the gas phase formed by the gas bubbles and a two-phase mixture to be formed.

The gas can be chosen from argon (Ar), helium (He), nitrogen ($N_2$), oxygen ($O_2$), hydrogen ($H_2$), carbon dioxide ($CO_2$), nitrogen protoxide ($N_2O$), methane ($CH_4$) and a mixture of at least two of these gases.

By way of example of a gas mixture, air which corresponds to a mixture of $N_2$, $O_2$ and $CO_2$ can obviously be mentioned.

As regards step (c) of the production method according to the invention, it consists in injecting the two-phase mixture, for example onto a surface or a support, whereby, after expansion or dispersion of the gas present in the two-phase mixture, the stable and self-supporting aqueous foam is obtained.

This step (c) can be made after step (b) of obtaining the two-phase mixture. The contacting of the solution with the pressurised gas for obtaining the two-phase mixture, and then injecting this two-phase mixture, can then be made by means of a device such as a pressurised gas system of the cream siphon type or even by means of a compressed air generator.

But step (c) can also be made at the same time as step (b) of obtaining the two-phase mixture: steps (b) and (c) are then concomitant and can for example be made by means of a device such as a frit patterning generator.

The invention relates, secondly, to an aqueous foam such as obtained, or likely to be obtained, by the production method just described, it being understood that the advantageous characteristics of this method can be taken alone or in combination.

The aqueous foam according to the invention is distinguished, in particular, by the three following cumulative characteristics:
- a minimum expansion ratio ER value higher than or equal to 3, reflecting that the aqueous foam has a loose alveolar structure,
- a collapse which, when measured one hour after depositing the aqueous foam into a graduated cylinder, is lower than or equal to 15%, reflecting a stability of the aqueous foam over time, and
- an absence of collapse, as measured one hour after depositing onto a surface in the absence of a support (of the cylinder or tent type), of an aggregate of aqueous foam having a 1.50 m diameter and a 50 cm height, meaning that the aqueous foam has self-supporting properties, as well as, complementarily and advantageously,
- a decrease in the concentration of chemical species, in particular of metallic cations, present in the drainage liquid phase relative to the concentration of chemical species present in the solution, reflecting some ability to retain these chemical species and thus to reduce diffusion of such species in the drainage liquid phase, meaning that the aqueous foam has complexing properties.

In a particularly advantageous alternative of the invention, when the solution further comprises at least one nitrogenous polysaccharide and, optionally, at least one compound enabling the nitrogenous polysaccharide to be dissolved in the solution, the aqueous foam has particularly improved complexing properties.

The invention relates, thirdly, to a use of the aqueous foam as described above.

The aqueous foam can be used in many fields, and in particular:
- in the field of decontamination, and more particularly in the field of nuclear decontamination,
- in the field of purification of effluents,
- in the field of containment of explosive devices or devices suspected of being explosive, or even
- in the field of defusing of explosive devices or devices suspected of being explosive.

The aqueous foam can be used to complex at least one metal in cationic form in many fields, and in particular in the fields listed above.

This metal can be chosen in a wide range of metals.

In an advantageous alternative of the invention, the metal can be chosen from a transition metal, a lanthanide and an actinide and, advantageously, from a transition metal and a lanthanide.

When the metal is a transition metal, it can be chosen from scandium Sc, titanium Ti, vanadium V, chromium Cr, manganese Mn, iron Fe, cobalt Co, nickel Ni, copper Cu, zinc Zn, zirconium Zr, niobium Nb, silver Ag, hafnium Hf, tantalum Ta, gold Au and mercury Hg.

When the metal is a lanthanide, it can be chosen from neodymium Nd, europium Eu, gadolinium Gd and ytterbium Yb.

Further advantages and characteristics of the present invention will more clearly appear from the description that follows and which relates to particular embodiments of the invention, in particular to the production of different aqueous foams, some in accordance with the invention and other being comparative ones, as well as their respective assessments in terms of stability, complexing properties and self-supporting properties.

Of course, these particular embodiments of the invention, which are especially described in connection with the appended FIGS. 1 and 2, are only given by way of illustrating purposes and do not constitute in any way a limitation of the object of this invention.

DETAILED DISCLOSURE OF PARTICULAR EMBODIMENTS

Figure 1:
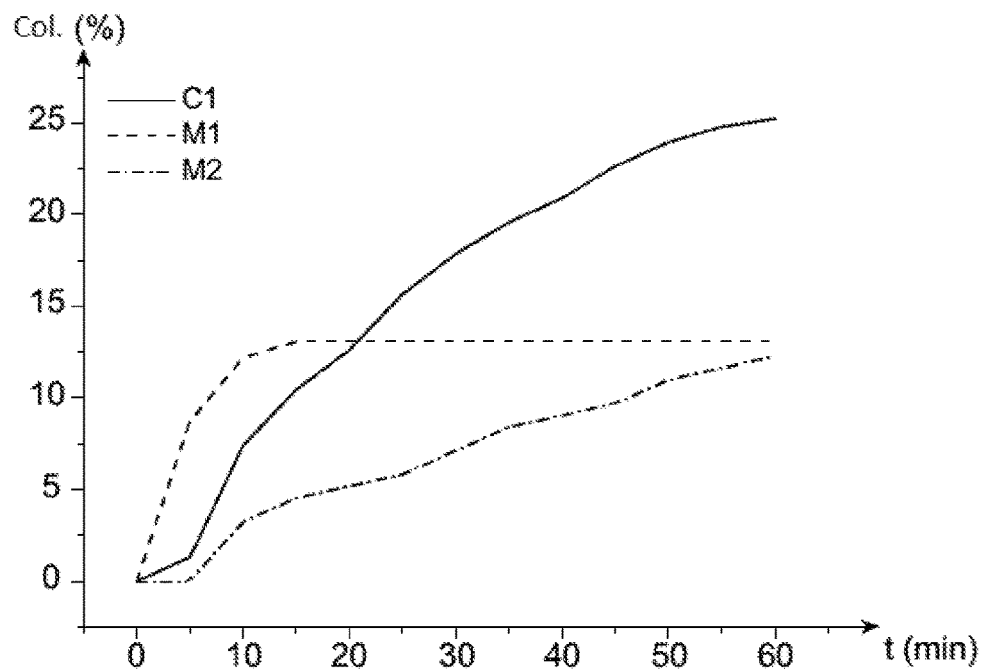
FIG. 1 illustrates the evolution, as a function of time (noted t and expressed in min), of the collapse (noted Col. and expressed in %) of the aggregates of the aqueous foams in accordance with the invention M1, M2 and the comparative aqueous foam C1.

Assessment of the Stability of Aqueous Foams

Three aqueous foams, noted M1, M2 and C1, have been produced, M1 and M2 being aqueous foams in accordance with the invention and C1 being a comparative aqueous foam.

For each of these three foams M1, M2 and C1, the structure as well as the stability have been assessed by the respective measurements of the expansion ratio ER and collapse according to the modalities set forth hereinafter.

The surfactant implemented is marketed by Eau & Feu company under the reference DP-SF/2. This surfactant DP-SF/2 is formed by a mixture of anionic surfactants (from 1 to 2% mass sodium octylsulphate, from 2 to 3% mass sodium decylsulphate and from 1 to 2% mass sodium laurylethersulphate) and a non-ionic surfactant in water (76-77% mass), propylene glycol (5 to 6% mass) and propylene glycol monobutylether (8 to 9% mass).

Production and Assessment of the Aqueous Foam M1 (According to the Invention)

In a 500 mL erlenmeyer flask, 20 g of surfactant DP-SF/2, 250 mL of distilled water and then 3.75 g of agar-agar are introduced. The solution, noted S1, is then placed under stirring at a 90° C. temperature until it is fully homogenous. Heating is then stopped and then, when the solution temperature reaches 60° C., the solution S1 is poured into in a 500 mL cream siphon.

After the siphon is closed, a nitrogen protoxide cartridge is screwed in the location therefor. The siphon is then manually stirred from top to bottom for about 15 seconds for obtaining a homogenous two-phase mixture.

The siphon is then put upside down (cannula downwards) above a 250 mL graduated cylinder which has been tared beforehand, for calculating the expansion ratio ER.

The injection of the two-phase mixture is then conducted, by applying a slight pressure to the siphon lever, in the graduated cylinder until a 230 mL height of aqueous foam M1 is reached.

The filled cylinder is then weighed and the corresponding mass of aqueous foam M1 is determined. The volume of the solution S1 injected is then calculated by dividing the mass of the aqueous foam M1 by the density of this aqueous foam M1 which is 1.0. The expansion ratio ER value is then calculated: ER is 4.1 for the aqueous foam M1.

The evolution of the height of the aqueous foam M1 is followed over a period of one hour. It is observed that, at the end of one hour, a 30 mL volume of aqueous foam M1 has been lost, which corresponds to a 13% collapse.

M1 thus has a loose alveolar structure (expansion ratio higher than or equal to 3) and also satisfies the definition of a stable aqueous foam for the purposes of the present invention (collapse lower than or equal to 15%).

Production and Assessment of the Aqueous Foam M2 (According to the Invention)

In a first erlenmeyer flask, 100 mL of distilled water containing 0.3% mass acetic acid, and then 0.75 g of chitosan from shrimp shell and having an N-deacetylation degree DD higher than 75% are introduced. The whole is then placed under stirring and heated at 80° C. until it is fully homogenised. Then, 2.25 g of agar-agar are added to form a first aqueous solution, which is then heated, under stirring, at 95° C. until it is homogenised. The temperature is then thermally controlled to 80° C. for 1 h.

In a second erlenmeyer flask, 100 mL of distilled water containing 0.3% mass acetic acid, and then 16 g of surfactant DP-SF/2 are introduced to form a second aqueous solution.

100 mL of this second aqueous solution are then introduced in the first erlenmeyer flask. The solution, thus formed by the first and second aqueous solutions, and noted S2, is placed under mechanical stirring (ultra-turax type) until it is fully homogenised. Heating is then stopped and then, when the temperature of the solution reaches 60° C., the solution S2 is poured into a 500 mL cream siphon.

After the siphon is closed, a nitrogen protoxide cartridge is screwed in the location therefor. The siphon is then manually stirred from top to bottom for about 15 seconds for obtaining a homogenous two-phase mixture.

As described above, the siphon is then put upside down above a 250 mL (tared beforehand) graduated cylinder.

Then, the injection of the two-phase mixture is conducted, by applying a slight pressure onto the siphon lever, in the graduated cylinder until a 155 mL height of aqueous foam M2 is reached.

The cylinder thus filled is then weighed. The volume of solution S2 injected is deduced from the mass measured as previously indicated and the expansion ratio ER value is determined: ER is 3.1 for the aqueous foam M2.

The evolution of the height of the aqueous foam M2 is followed over a period of one hour. It is observed that, at the end of one hour, a 19 mL volume of aqueous foam M2 has been lost, which corresponds to a 12.2% collapse.

M2 thus has a loose alveolar structure (expansion ratio higher than or equal to 3) and also satisfies the definition of a stable aqueous foam for the purposes of the present invention (collapse lower than or equal to 15%).

Production and Assessment of the (Comparative) Aqueous Foam C1

In a 500 mL erlenmeyer flask, 20 g of surfactant DP-SF/2 and 250 mL of distilled water are introduced. The solution, noted SC1, is then placed under stirring until the surfactant is fully dissolved. The solution SC1 is then poured into a 500 mL cream siphon.

After the siphon is closed and a nitrogen protoxide cartridge is placed, the siphon is manually stirred from top to bottom for about 15 seconds.

As described above, the siphon is then put upside down above a 250 mL (tared beforehand) graduated cylinder.

Then the injection of the two-phase mixture is conducted, by applying a slight pressure onto the siphon lever, in the graduated cylinder until a 230 mL height of aqueous foam C1 is reached.

The cylinder thus filled is then weighed. The volume of solution SC1 injected is deduced from the mass measured as indicated previously and the expansion ratio ER value is determined: ER is 5.7 for the aqueous foam C1.

The evolution of the height of the aqueous foam C1 is followed over a period of one hour. It is observed that, at the end of one hour, a 58 mL volume of aqueous foam C1 has been lost, which corresponds to a 25.2% collapse.

If C1 has thus a loose alveolar structure (expansion ratio higher than or equal to 3), C1 does not satisfy the definition of a stable aqueous foam for the purposes of the present invention (collapse markedly higher than 15%).

The evolution of the collapse of the different aqueous foams M1, M2 and C1, as observed within the hour following their respective deposition in the graduated cylinder, is illustrated in FIG. 1.

The curves of FIG. 1 clearly highlight that the aqueous foams M1 and M2 according to the invention have a stability markedly higher than the stability of the comparative aqueous foam C1.

Assessment of the Complexing Properties of Aqueous Foams

Two aqueous foams in accordance with the invention, noted M3 and M4, have been produced, the aqueous foam M3 being obtained from solution S3 and aqueous foam M4 being obtained from solution S4.

To assess the respective complexing properties of these aqueous foams M3 and M4, specific solutions S3 and S4 have been respectively made, wherein a metal salt has been added (here and alternatively, $CuCl_2$, $ZnCl_2$ and $Co(NO_3)_2$, $6H_2O$), so as to reach an initial concentration of metal cation ($Cu^{2+}$, $Zn^{2+}$ or $Co^{2+}$) of 2.5 g/L in solutions S3 and S4.

The residual concentration of metal cation ($Cu^{2+}$, $Zn^{2+}$ or $Co^{2+}$) in the drainage liquid phase collected over a period of 15 min after forming each of the aqueous foams M3 and M4 has then been assessed, by UV-visible spectroscopy. The comparison of the signal thus obtained with the signals obtained beforehand with standard-solutions enabled this residual concentration to be determined.

Preparation of Solution S3

In a first erlenmeyer flask, 150 mL of distilled water containing 5% mass acetic acid, and then 1.125 g of chitosan from shrimp shell and having an N-deacetylation degree DD higher than 75% are introduced. The whole is then placed under stirring and heated at 80° C. until it is fully homogenised. 3.375 g of agar-agar are then added to form a first aqueous solution, which is then heated, under stirring, at 95° C. until it is homogenised. The temperature is then thermally controlled at 80° C. for 1 h.

In a second erlenmeyer flask, 150 mL of distilled water containing 5% mass acetic acid, and then 24 g of surfactant DP-SF/2 are introduced to form a second aqueous solution. 150 mL of this second aqueous solution are then introduced in the first erlenmeyer flask. The solution S3 formed by the first and second aqueous solutions is placed under mechanical stirring (ultra-turax type) until it is fully homogenised. Heating is then stopped.

Preparation of Solution S4

In an erlenmeyer flask, 300 mL of distilled water containing 5% mass acetic acid, and then 24 g of surfactant DP-SF/2 and 4.5 g of agar-agar are introduced. The solution thus obtained, noted S4, is then heated, under stirring, at 95° C. until it is homogenised. The temperature is then thermally controlled at 60° C. for 1 h. Then, heating is stopped.

Assessment of the Complexing Properties to $Cu^{2+}$ of Aqueous Foams M3 and M4

100 mL of solution S3 thus prepared are retained in order to make so-called "standard-solutions" of $CuCl_2$.

For this, solution S3 is diluted a first time at 50% by adding 100 mL of distilled water to 100 mL of this solution S3. Then, 1.058 g of $CuCl_2$ is added to this diluted solution. 200 mL of a stock-solution are obtained which comprises a 2.5 g/L initial concentration of cations $Cu^{2+}$.

Thus obtained stock-solution is then fractioned. A fraction of the stock-solution is preserved whereas the other fractions are diluted, by adding water, so as to obtain working-solutions with respective initial concentrations of cations $Cu^{2+}$ of 2 g/L, 1.5 g/L, 1.25 g/L, 1 g/L, 0.75 g/L, 0.5 g/L and 0.25 g/L.

These different fractions of stock-solution and working-solutions, prepared from solution S3, are then examined by UV visible spectrometry on a wavelength range from 600 nm to 1 000 nm. The absorbance values corresponding to the copper signal are read out so as to obtain a calibration straight line of the concentration of cations $Cu^{2+}$ for solution S3.

The handling procedure and absorbance value measurement method just described are reproduced in the same operating conditions, except for the replacement of solution S3 by solution S4. A calibration straight line of the concentration of cations $Cu^{2+}$ is thus also obtained for solution S4.

100 mL of solution S3 thus prepared are sampled. To this solution S3, 1.058 g of $CuCl_2$ are added, so as to obtain a solution with a 5 g/L concentration of cations $Cu^{2+}$.

The solution thus obtained is then poured into in a 500 mL cream siphon. After the siphon is closed, a nitrogen protoxide cartridge is screwed in the location therefor. The siphon is then manually stirred from top to bottom for about 15 seconds for obtaining a homogenous two-phase mixture.

The siphon is then put upside down (cannula downwards) above an erlenmeyer flask provided with a frit acting as a liquid filter. The injection of the two-phase mixture is then conducted, by applying a slight pressure onto the siphon lever, and a deposit of aqueous foam M3 is obtained on the frit.

Then, the drainage liquid phase is allowed to flow in the erlenmeyer flask through the frit for a 15 min duration after the aqueous foam M3 is deposited. The drainage liquid phase is then sampled, diluted once at 50% (so as to obtain a dilution rate similar to that of the standard-solutions), and then analysed by UV visible spectrometry (between 600 nm and 1 000 nm). The absorbance value corresponding to the copper signal is read out and then compared to the calibration straight line set beforehand.

After a 15 min duration, the residual concentration of cations $Cu^{2+}$ is read out, in the drainage liquid phase, as being 1.29 g/L, which corresponds to 52% of the concentration of cations $Cu^{2+}$ in solution S3 before injection. In other words, the aqueous foam M3 enabled 48% of cations $Cu^{2+}$ to be retained.

By applying a similar protocol made from 100 mL of solution S4, in place of solution S3, a residual concentration of cations $Cu^{2+}$ is obtained, in the drainage liquid phase, of 1.72 g/L, which corresponds to 69% of the concentration of cations $Cu^{2+}$ in the solution S4 before injection. In other words, the aqueous foam M4 enabled 31% of cations $Cu^{2+}$ to be retained.

Assessment of the Complexing Properties to $Zn^{2+}$ of Aqueous Foams M3 and M4

For assessing complexing properties of the aqueous foam M3 to $Zn^{2+}$, a calibration stock-solution and working-solutions are made from solution S3.

For this, a similar protocol to that described above is reproduced for assessing the complexing properties to cations $Cu^{2+}$.

A stock-solution comprising a 2.5 g/L initial concentration of cations $Zn^{2+}$ is prepared by adding 1.042 g of $ZnCl_2$ to the solution S3 diluted beforehand to 50% using deionised water. The working-solutions are then prepared according to a protocol similar to that previously described. These working-solutions are then re-diluted: deionised water is added in each working solution, until their respective volume is 10 times greater than their initial volume (this dilution enables the saturation of the UV-visible signal of zinc to be avoided).

The absorbance values corresponding to the zinc signal which are measured, by UV visible spectrometry on a wavelength range from 200 nm to 300 nm, for the different fractions of stock-solution and working-solutions, enabled a calibration straight line to be set.

1.042 g of $ZnCl_2$ have been added to 100 mL of solution S3, so as to obtain a solution with a 5 g/L initial concentration of cations $Zn^{2+}$.

The protocol for producing the aqueous foam as described above has then been reproduced and the sampling of the drainage liquid phase flown 15 min after depositing the aqueous foam on the frit and collected in the erlenmeyer flask has been conducted.

A volume of this drainage liquid phase has been sampled and then diluted. For this, this volume has been multiplied by 20 by adding the suitable amount of deionised water. In this way, the drainage liquid phase undergoes the same dilution factor as the standard-solutions. The diluted drainage liquid phase is then analysed by UV visible spectrometry (between 200 nm and 3 000 nm). The absorbance value corresponding to the zinc signal has been read out and then compared to the calibration straight line set beforehand.

It is observed that, after a 15 min duration, the residual concentration of cations $Zn^{2+}$, in the drainage liquid phase, is 1.40 g/L, which corresponds to 56% of the concentration of cations $Zn^{2+}$ in solution S3 before injection. In other words, aqueous foam M3 enabled 44% of cations $Zn^{2+}$ to be complexed.

By applying a similar protocol made from 100 mL of solution S4, in place of solution S3, a residual concentration of cations $Zn^{2+}$, in the drainage liquid phase, of 1.49 g/L is obtained, which corresponds to 60% of the concentration of cations $Zn^{2+}$ in solution S4 before injection. In other words, aqueous foam M4 enabled 40% of cations $Zn^{2+}$ to be complexed.

Assessment of the Complexing Properties to $Co^{2+}$ of Aqueous Foams M3 and M4

For assessing the complexing properties of aqueous foam M3 to cations $Co^{2+}$, a calibration stock-solution and working-solutions have been made from solution S3.

For this, a protocol similar to that described above for assessing the complexing properties to cations $Cu^{2+}$ has been reproduced.

A stock-solution comprising an initial concentration of 2.5 g/L of cations $Co^{2+}$ is prepared by adding 2.468 g of $Co(NO_3)_2,6H_2O$ to the solution S3 diluted beforehand to 50% using deionised water. The working-solutions are then prepared according to a protocol similar to that previously described. These working-solutions are then re-diluted: deionised water is added in each working-solution, until their respective volume is 5 times greater than their initial volume (this dilution enables the saturation of the UV-visible signal of cobalt to be avoided).

The absorbance values corresponding to the cobalt signal measured by UV visible spectrometry on a wavelength range from 250 nm to 360 nm, for the different fractions of stock-solution and working-solutions, enabled a calibration straight line to be set.

2.468 g of $Co(NO_3)_2,6H_2O$ have been added to 100 mL of solution S3, so as to obtain a solution with a 5 g/L initial concentration of cations $Co^{2+}$.

The protocol for producing the aqueous foam as described above has then been reproduced and the sampling of the drainage liquid phase flown 15 min after depositing the aqueous foam onto the frit and collected in the erlenmeyer flask has been conducted.

A volume of this drainage liquid phase has been sampled and then diluted. For this, this volume has been multiplied by 10 by adding the suitable amount of deionised water. In this way, the drainage liquid phase undergoes the same dilution factor as the standard-solutions. The diluted drainage liquid phase is then analysed by UV visible spectrometry (between 250 nm and 360 nm). The absorbance value corresponding to the cobalt signal has been read out and then compared to the calibration straight line set beforehand.

It is observed that, after a 15 min duration, the residual concentration of cations $Co^{2+}$, in the drainage liquid phase, is 1.00 g/L, which corresponds to 40% of the concentration of cations $Co^{2+}$ in solution S3 before injection. In other words, aqueous foam M3 enabled 60% of cations $Co^{2+}$ to be complexed.

By applying a similar protocol made from 100 mL of solution S4, in place of solution S3, a residual concentration of cations $Co^{2+}$ is obtained, in the drainage liquid phase, of 1.99 g/L, which corresponds to 80% of the concentration of cations $Co^{2+}$ in solution S3 before injection. In other words, aqueous foam M4 only enabled 20% of cations $Co^{2+}$ to be complexed.

Figure 2:
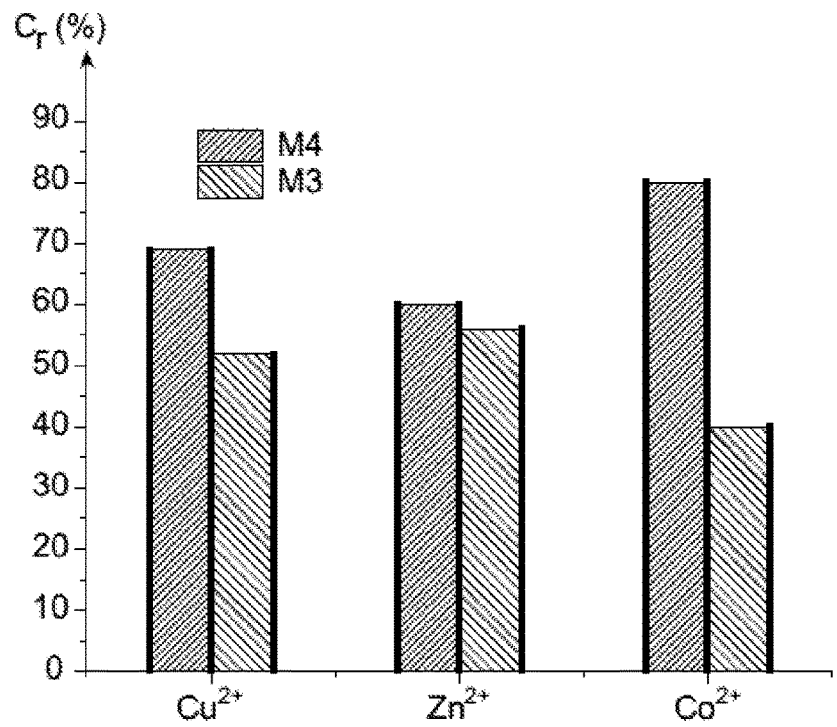
FIG. 2 is a histogram illustrating the distribution in the residual concentration of cations $Cu^{2+}$, $Zn^{2+}$ and $Co^{2+}$ in the drainage liquid phases of the aqueous foams according to the invention M3 and M4, respectively prepared from the solutions S3 and S4, this residual concentration being noted $C_r$ and being expressed as % relative to the initial concentration of these cations in solutions S3 and S4.

The residual concentrations of cations $Cu^{2+}$, $Zn^{2+}$ and $Co^{2+}$ in the drainage liquid phases from the different foams M3 and M4 are reported in FIG. 2.

This FIG. 2 clearly highlights that the aqueous foams M3 and M4 in accordance with the invention have complexing properties, since their residual concentrations are each lower than the initial concentrations.

FIG. 2 also shows that the complexing properties of an aqueous foam in accordance with the invention are improved by the presence of chitosan in the solution (solution S3) regardless of the cation considered.

The presence of chitosan improves particularly significantly the complexation, and thus retention or sequestration, of cations $Co^{2+}$, which has an undeniable interest for any application for fighting against cobalt pollution, in particular the decontamination of cobalt 60 based ionising sources.

Assessment of the Self-Supporting Properties of Aqueous Foams

Two aqueous foams, noted M5 and C5, have been produced, M5 being an aqueous foam according to the invention and C5 being a comparative aqueous foam.

For assessing the self-supporting properties of each of these aqueous foams M5 and C5, the behaviour of an aggregate of each of them has been assessed after deposition on a surface in the absence of any support.

Production and Assessment of Aqueous Foam M5 (According to the Invention)

In a vessel containing 4 L water, 240 g of surfactant DP-SF/2 and 60 g of agar-agar are introduced. The solution obtained, noted S5, is then placed under stirring and heated at a 95° C. temperature until it is fully homogenous. The temperature is then thermally controlled at 58° C. until it is injected.

Solution S5 is then introduced in a compressed air foam generator marketed by the ERPI company. Contacting solution S5 with a pressurised gas, forming a two-phase mixture and injecting this two-phase mixture are concomitantly provided by diffusion of solution S5 as a spray through mesh wires on which a constant air flow is applied.

As a result, an aqueous foam M5, the expansion ratio ER of which can range from 5 to 80, is formed, depending on the flow rates of solution S5, on the one hand, and air, on the other hand.

It is observed that the films making up the alveolar structure of aqueous foam M5 gel upon cooling this aqueous foam M5.

Indeed, the gelling temperature depends on the agar-agar concentration in the solvent (here, water). But, in solution S5, this agar-agar concentration being 15 g/L solvent, the gelling temperature is in the order of 35° C.

Thus, at a temperature lower than the gelling temperature, and in particular at room temperature, the aqueous foam M5 that is obtained is sufficiently elastic to minimise its spreading during injection and thus enabling the formation of an aggregate, or a mound, of an aqueous foam M5 with a 70 cm height and a 2 m diameter, that is far beyond the required dimensions to consider that an aqueous foam is self-supporting in the absence of a support.

This aqueous foam M5 has the interest neither to collapse, near to drain, on a minimum period of 24 h, which facilitates handling and recovery after use thereof.

In the case of a use of an aqueous foam in accordance with the invention as a decontaminant, the non-draining properties of said aqueous foam are such that there will be neither streaming, nor infiltration of the aqueous phase of the aqueous foam into the sol, the aqueous foam being further possibly be easily recovered, for example by sucking or by means of a shovel.

Production and Assessment of (Comparative) Aqueous Foam C5

In a vessel containing 4 L water, 240 g of surfactant DP-SF/2 are introduced. The solution obtained, noted SC5, is then placed under stirring and at room temperature until it is fully homogenised.

Solution SC5 is then introduced in a foam generator marketed by the ERPI company. Contacting solution SC5 with a pressurised gas, forming the two-phase mixture and injecting this two-phase mixture are concomitantly provided by diffusing of solution SC5 as a spray through mesh wires on which a constant air flow is applied.

As previously described, an aqueous foam C5, the expansion ratio ER of which can range from 5 to 80, is formed, depending on the flow rates of solution SC5, on the one hand, and of air, on the other hand.

Unlike the previously described aqueous foam M5, which is characterised by excellent self-supporting and non-draining properties, this aqueous foam C5, which is produced from solution SC5 not comprising a gelling compound such as agar-agar, does not enable aggregates of aqueous foam which are self-supporting to be formed. Indeed, it has not been possible to make an aggregate, or a mound, with a 70 cm height and a 2 m diameter, which is stable on a period of 24 h, because of the spreading of the aggregate of aqueous foam C5 from the first hour following deposition. The streaming related to the drainage phenomenon also occurred within 5 min following deposition.

REFERENCE LIST

[1] U.S. Pat. No. 5,360,828
[2] U.S. Pat. No. 5,382,285

The invention claimed is:

1. A method for producing an aqueous foam comprising the following steps of:
    (a) preparing a solution comprising at least one surfactant and at least one protic polar solvent,
    (b) contacting the solution prepared in step (a) with a pressurised gas, whereby a two-phase mixture is obtained, and
    (c) injecting the two-phase mixture obtained in step (b), whereby, after expansion or dispersion of the gas, the aqueous foam is obtained,
wherein the solution further comprises at least one gelling compound chosen from agar-agar as a non-nitrogenous polysaccharide and gelatine.

2. The production method according to claim 1, wherein the solution further comprises at least one nitrogenous polysaccharide and, optionally, at least one compound enabling the nitrogenous polysaccharide(s) to be dissolved in the solution.

3. The production method according to claim 1, wherein the mass proportions, relative to the mass of the protic polar solvent(s), are:
    from 1% to 20% of the gelling compound(s)
    from 5% to 25% of the surfactant(s), and
    from 0% to 10% of a compound(s) enabling the nitrogenous polysaccharide to be dissolved in the solution.

4. The production method according to claim 2, wherein the mass proportions relative to the mass of the protic polar solvent(s) are:
    from 1% to 20% of the gelling compound(s) and of the nitrogenous polysaccharide(s):
    from 5% to 25% of the surfactant(s), and
    from 0% to 10% of the compound enabling the nitrogenous polysaccharide to be dissolved in the solution.

5. The production method according to claim 2, wherein the nitrogenous polysaccharide is a chitosan.

6. The production method according to claim 5, wherein the chitosan has the following structural formula (I):

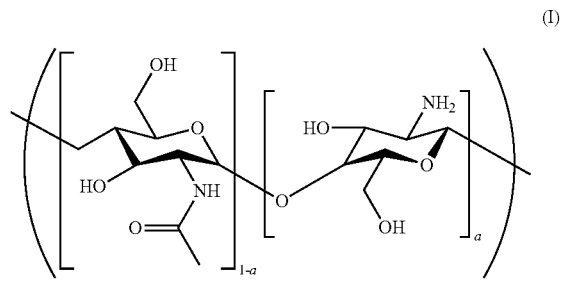

with a such that $0<a<1$.

7. The production method according to claim 2, wherein the solution comprises at least one compound enabling the nitrogenous polysaccharide(s) to be dissolved in the solution, and the compound enabling said nitrogenous polysaccharide to be dissolved in the solution is chosen from an inorganic acid, an organic acid and a mixture of two or more of these acids.

8. The production method according to claim 1, wherein the protic polar solvent is chosen from water and an alcohol.

9. The production method according to claim 1, wherein the surfactant is chosen from anionic surfactants, cationic surfactants, non-ionic surfactants and mixtures thereof.

10. The production method according to claim 1, wherein the gas implemented in step (b) is chosen from Ar, He, $N_2$, $O_2$, $H_2$, $CO_2$, $N_2O$, $CH_4$ and the mixture of at least two of these gases.

11. The production method according to claim 1, wherein steps (b) and (c) are concomitant.

12. The production method according to claim 6, wherein α is such that $0.5<\alpha \leq 1$.

13. The production method according to claim 6, wherein α is such that $0.75 \leq \alpha \leq 1$.

14. The production method according to claim 2, wherein the solution comprises at least one compound enabling the nitrogenous polysaccharide(s) to be dissolved in the solution, and the compound enabling said nitrogenous polysaccharide to be dissolved in the solution is an inorganic acid selected from the group consisting of HCl, HBr, HF, $H_2SO_4$ and $H_3PO_4$.

15. The production method according to claim 2, wherein the solution comprises at least one compound enabling the nitrogenous polysaccharide(s) to be dissolved in the solution, and the compound enabling said nitrogenous polysaccharide to be dissolved in the solution is chosen from an organic acid selected from the group consisting of a carboxylic acid having the molecular formula $C_mH_{2m+1}COOH$ with $0 \leq m \leq 5$ and a dicarboxylic acid having the molecular formula $HOOC(CH_2)_mCOOH$ with $0 \leq m \leq 5$.

16. The production method according to claim 1, wherein the protic polar solvent is an alcohol having the molecular formula $C_nH_{2n+2}O$, with $1 \leq n \leq 5$.

* * * * *